United States Patent
Xiong et al.

(10) Patent No.: US 10,501,345 B2
(45) Date of Patent: *Dec. 10, 2019

(54) LOW RISK CHLORINE DIOXIDE ONSITE GENERATION SYSTEM

(71) Applicant: Ecolab USA, Inc., St. Paul, MN (US)

(72) Inventors: Kun Xiong, Naperville, IL (US); Emily Rader, Knoxville, TN (US); James L. Jefferson, Dallas, GA (US); Felice DiMascio, Simsbury, CT (US); Donald O'Brien, Geneva, IL (US); Nicholas Ryan Denny, Glen Ellyn, IL (US); Gary Tabor, Naperville, IL (US); David R. Papanek, Glenshaw, PA (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,749

(22) Filed: Mar. 22, 2018

(65) Prior Publication Data

US 2019/0055146 A1     Feb. 21, 2019

Related U.S. Application Data

(60) Provisional application No. 62/546,890, filed on Aug. 17, 2017.

(51) Int. Cl.
   *C01B 11/02*           (2006.01)
   *C02F 1/00*            (2006.01)
   (Continued)

(52) U.S. Cl.
   CPC .............. *C02F 1/50* (2013.01); *C01B 11/026* (2013.01); *C02F 1/686* (2013.01); *C02F 1/76* (2013.01);
   (Continued)

(58) Field of Classification Search
   CPC .......... C01B 11/026; C02F 1/006; C02F 1/50; C02F 1/686; C02F 1/76; C02F 2103/023;
   (Continued)

(56) References Cited

U.S. PATENT DOCUMENTS

| | | |
|---|---|---|
| 4,678,655 A | 7/1987 | Twardowski |
| 4,790,943 A | 12/1988 | Dunn et al. |

(Continued)

FOREIGN PATENT DOCUMENTS

| | | |
|---|---|---|
| CA | 2539984 A1 | 9/2005 |
| CN | 2654587 Y | 11/2004 |

(Continued)

OTHER PUBLICATIONS

DuPont™ Oxone® Monopersulfate Compound (K20101), The Right Choice for Oxidation, 3 pages (2008).

(Continued)

*Primary Examiner* — Lucas A Stelling
(74) *Attorney, Agent, or Firm* — Eric D. Babych; Brinks Gilson & Lione

(57) ABSTRACT

The present disclosure generally relates to methods of treating process water using a reactor for generating chlorine dioxide onsite. The onsite generation system may include double ensured precursor feeding, effective reactor, automated control/alarm, and effective product delivery. The reactor may include a mixing device, a first feed line connected to the mixing device, and a second feed line connected to the mixing device. The reactor may include a proximal portion in fluid communication with the mixing device and a distal portion in fluid communication with a motive water line. The mixing device, the reactor, a portion of the first feed line, and a portion of the second feed line may be positioned within the motive water line.

23 Claims, 7 Drawing Sheets

(51) Int. Cl.
*C02F 1/50* (2006.01)
*C02F 1/68* (2006.01)
*C02F 1/76* (2006.01)
C02F 103/02 (2006.01)

(52) U.S. Cl.
CPC ........ *C02F 1/006* (2013.01); *C02F 2103/023* (2013.01); *C02F 2209/005* (2013.01); *C02F 2209/03* (2013.01); *C02F 2209/29* (2013.01); *C02F 2209/40* (2013.01); *C02F 2303/04* (2013.01)

(58) Field of Classification Search
CPC ............ C02F 2209/005; C02F 2209/03; C02F 2209/29; C02F 2209/40; C02F 2303/04
See application file for complete search history.

(56) References Cited

U.S. PATENT DOCUMENTS

| | | | |
|---|---|---|---|
| 4,886,653 | A | 12/1989 | Gasper et al. |
| 5,091,166 | A | 2/1992 | Engstrom et al. |
| 5,227,031 | A | 7/1993 | Sundblad |
| 5,273,733 | A | 12/1993 | Winters et al. |
| 5,366,714 | A | 11/1994 | Bigauskas |
| 5,376,350 | A | 12/1994 | Tenney et al. |
| 5,380,517 | A | 1/1995 | Sokol |
| 5,380,518 | A | 1/1995 | Roozdar |
| 5,399,288 | A | 3/1995 | Marzouk et al. |
| 5,855,861 | A | 1/1999 | Lee |
| 5,863,584 | A | 1/1999 | Thomas, Jr. et al. |
| 5,895,638 | A | 4/1999 | Tenney |
| 6,387,344 | B1 | 5/2002 | Tenney et al. |
| 6,428,696 | B2 | 8/2002 | Küke |
| 6,790,427 | B2 | 9/2004 | Charles et al. |
| 6,840,251 | B2 | 1/2005 | Gill et al. |
| 7,407,642 | B2 | 8/2008 | Mussari et al. |
| 7,452,511 | B2 | 11/2008 | Schmitz et al. |
| 8,168,153 | B2 | 5/2012 | Sokol et al. |
| 8,486,276 | B2 | 7/2013 | Duve |
| 8,647,598 | B2 | 2/2014 | Grimland et al. |
| 8,691,154 | B2 | 4/2014 | Sperry et al. |
| 8,784,733 | B2 | 7/2014 | Alarid et al. |
| 9,061,927 | B2 | 6/2015 | Belluati et al. |
| 9,238,587 | B2 | 1/2016 | Mason |
| 2003/0031621 | A1 | 2/2003 | Gravitt et al. |
| 2003/0200997 | A1 | 10/2003 | Gill et al. |
| 2004/0175322 | A1 | 9/2004 | Woodruff et al. |
| 2005/0186131 | A1 | 8/2005 | Charles et al. |
| 2005/0244328 | A1 | 11/2005 | Schmitz et al. |
| 2006/0133983 | A1 | 6/2006 | Charles et al. |
| 2007/0116637 | A1 | 5/2007 | Woodruff et al. |
| 2007/0237708 | A1 | 10/2007 | Woodruff et al. |
| 2009/0159538 | A1 | 6/2009 | Duve |
| 2010/0155341 | A1 | 6/2010 | Duve |
| 2011/0182800 | A1 | 7/2011 | Hultén et al. |
| 2011/0262342 | A1 | 10/2011 | Richardson et al. |
| 2012/0183469 | A1 | 7/2012 | Mussari |
| 2012/0294794 | A1 | 11/2012 | Pelin |
| 2012/0305494 | A1 | 12/2012 | DiMascio |
| 2013/0015113 | A1 | 1/2013 | Mussari |
| 2013/0106003 | A1 | 5/2013 | Duve |
| 2013/0209349 | A1 | 8/2013 | Vilhelmsson et al. |
| 2014/0138325 | A1 | 5/2014 | Tomsheck |
| 2014/0299552 | A1 | 10/2014 | Stewart et al. |
| 2014/0302176 | A1 | 10/2014 | Grund et al. |
| 2015/0021276 | A1 | 1/2015 | Rahkola et al. |
| 2016/0029639 | A1 | 2/2016 | DiMascio et al. |

FOREIGN PATENT DOCUMENTS

| | | |
|---|---|---|
| CN | 2700312 Y | 5/2005 |
| CN | 202880867 U | 4/2013 |
| CN | 105752931 A | 7/2016 |
| CN | 205472644 U | 8/2016 |
| DE | 102008042424 A1 | 6/2009 |
| DE | 102010027840 A1 | 10/2011 |
| EP | 0850875 A1 | 7/1998 |
| EP | 2581340 A1 | 4/2013 |
| WO | WO 2001/077012 A1 | 10/2001 |
| WO | WO 2003/000586 A1 | 1/2003 |
| WO | WO 2006/062455 A1 | 6/2006 |
| WO | WO 2008/058206 A2 | 5/2008 |
| WO | WO 2008/125075 A1 | 10/2008 |
| WO | WO 2016/140772 A1 | 9/2016 |
| WO | WO 2016/145487 A1 | 9/2016 |

OTHER PUBLICATIONS

DuPont™ Oxone® Monopersulfate Compound (k20102), General Technical Attributes, 4 pages (2008).

International Search Report and Written Opinion of International Application No. PCT/US2018/019660, 10 pages (dated May 16, 2018).

International Search Report and Written Opinion of International Application No. PCT/US2018/023784, 13 pages (dated Jul. 6, 2018).

International Search Report and Written Opinion of International Application No. PCT/US2018/023798, 12 pages (dated Jul. 6, 2018).

Katz, J., "Ozone and Chlorine Dioxide Technology for Disinfection of Drinking Water," Pollution Technology Review, No. 67, 669 Pages; ISBN-10: 0815508026; ISBN-13: 978-0815508021 (1980), Abstract only.

Wastewater Disinfection-MOP FD-10, Water Environment Federation, Alexandria, VA; Report No. MFD10GT, 300p; Accession No. WEF0009 (1996), Abstract only.

Yin, G., et al., "Addition of H2O2 to a methanol based ClO2 generator to decrease Cl2 emission: Mills trials resulted in a 60% reduction in chlorine emissions from stack gases," *Pulp & Paper Canada*, 104(5):62-64 (2003), Abstract only.

Zhang, Jiku., et al., "Study of manufacturing high pure chlorine dioxide with multi-stage compound chlorine dioxide generator," *Advanced Materials Research*, 550-553:3125-3130 (2012), Abstract only.

LOW RISK CHLORINE DIOXIDE ONSITE GENERATION SYSTEM

BACKGROUND

1. Field of the Invention

The present disclosure generally relates to methods of treating process water using a reactor for generating chlorine dioxide onsite.

2. Description of the Related Art

With the decline of gaseous chlorine as a microbiocide, various alternatives have been explored; including bleach, bleach with bromide, bromo-chloro dimethylhydantoin, ozone, and chlorine dioxide ($ClO_2$). Of these, chlorine dioxide has generated a great deal of interest for control of microbiological growth in a number of different industries, including the dairy industry, the beverage industry, the pulp and paper industry, the fruit and vegetable processing industries, various canning plants, the poultry industry, the beef processing industry and miscellaneous other food processing applications. Chlorine dioxide is also seeing increased use in municipal potable water treatment facilities and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well stimulation enhancement additive.

Unlike chlorine, chlorine dioxide remains a gas when dissolved in aqueous solutions and does not ionize to form weak acids. This property is at least partly responsible for the biocidal effectiveness of chlorine dioxide over a wide pH range. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against *legionella*, algae and amoebal cysts, giardia cysts, coliforms, *salmonella, shigella*, and *cryptosporidium*.

Unfortunately, chlorine dioxide in solution is unstable with an extremely short shelf life and thus, is not commercially available. Chlorine dioxide solutions must typically be generated at its point of use such as, for example, by a reaction between a metal chlorate or metal chlorite in aqueous solution and a liquid phase strong acid. However, the use of liquid phase strong acids poses handling issues and safety concerns.

Production of chlorine dioxide using chlorate, hydrogen peroxide, acid generates heat and may result in inadvertent explosive decomposition of chlorine dioxide if the temperature is not properly controlled.

BRIEF SUMMARY

In some embodiments, a method of treating process water is provided. The method may include feeding a first solution comprising an acid through a first feed line into a mixing device and feeding a second solution including chlorate and hydrogen peroxide through a second feed line into the mixing device. The method may include mixing the first solution and the second solution in the mixing device to form a reaction mixture, where the mixing device may be connected to a reactor and feeding the reaction mixture into the reactor. The method may further include reacting the acid, the chlorate, and the hydrogen peroxide to produce chlorine dioxide in the reactor. The reactor may include a proximal portion connected to the mixing device and a distal portion in fluid communication with a motive water line. The mixing device, the reactor, a portion of the first feed line, and a portion of the second feed line may be positioned within the motive water line. The method may include mixing the chlorine dioxide with motive water in the motive water line at the distal portion of the reactor, and injecting the chlorine dioxide and motive water into the process water.

In some embodiments, the method may include cooling the mixing device and the reactor with the motive water.

In some embodiments, the acid may be sulfuric acid.

In some embodiments, the method may include a reactor having a coiled configuration with a coil plane angle of about 1 degrees to about 60 degrees.

In some embodiments, the method may have the first feed line and the second feed line opposite to and directed against each other.

In some embodiments, the method may include having a reactor including at least one contact zone, wherein the contact zone may include an inner diameter at least two times larger than an inner diameter of the reactor.

In some embodiments, the method may include a motive water line having at least two longitudinal channels through which motive water may flow.

In some embodiments, the method may include the reaction mixture having a residence time in the reactor of at least about 0.1 minute, and the precursor velocity is at least about 25 cm/min, wherein the precursor velocity is a velocity of the first and second solutions.

In some embodiments, the method may include the reactor operated at a pressure about equal to or greater than atmospheric pressure.

In some embodiments, the method may include producing the chlorine dioxide at a rate ranging from about 0.001 lb/hour to about 20 lb/hour.

In some embodiments, the method may include operating the reactor at a temperature ranging from about 2° C. to about 80° C.

In some embodiments, the method may include determining a chlorine dioxide demand in the process water using measurements selected from a chlorine dioxide sensor, an oxidation and reduction potential, a flow meter, a microbiological measurement, and any combination thereof.

In some embodiments, the method may include a cooling tower that includes the process water.

In other embodiments, a method of producing chlorine dioxide is disclosed. The method may include feeding a first solution comprising an acid through a first feed line into a mixing device and feeding a second solution including chlorate and hydrogen peroxide through a second feed line into the mixing device. The method may include mixing the first solution and the second solution in the mixing device to form a reaction mixture, where the mixing device may be connected to a reactor and feeding the reaction mixture into the reactor. The method may further include reacting the acid, the chlorate, and the hydrogen peroxide in the reactor. The reactor may include a proximal portion connected to the mixing device and a distal portion in fluid communication with a motive water line. The mixing device, the reactor, a portion of the first feed line, and a portion of the second feed line may be positioned within the motive water line. The method may include mixing chlorine dioxide with motive water in the motive water line at the distal portion of the reactor.

In certain embodiments, a method is disclosed that may include feeding a first solution comprising an acid through a first feed line into a mixing device; feeding a second solution comprising chlorate and hydrogen peroxide through a second feed line into the mixing device; mixing the first solution and the second solution in the mixing device to form a reaction mixture, wherein the mixing device is connected to a reactor; feeding the reaction mixture into the reactor; reacting the acid, the chlorate, and the hydrogen peroxide to produce chlorine dioxide in the reactor, wherein the reactor comprises a proximal portion connected to the mixing device and a distal portion in fluid communication with a motive water line, wherein the mixing device, the reactor, a portion of the first feed line, and a portion of the second feed line are positioned within the motive water line; mixing the chlorine dioxide with motive water in the motive water line at the distal portion of the reactor; and injecting the chlorine dioxide into an aqueous system.

In some embodiments, the method may include a reactor that may be in fluid communication with a product feed line.

In some embodiments, the method may include determining a flow rate of the first solution in the first feed line.

In some embodiments, the method may include determining a flow rate of the second solution in the second feed line.

In some embodiments, the method may include determining a flow rate of a chlorine dioxide solution in a product feed line.

In some embodiments, the method may include determining a flow rate of the motive water in the motive water line.

In some embodiments, the method may include sensing a reactor pressure.

In some embodiments, the method may include calculating a chlorine dioxide dose.

In certain embodiments, a reactor is disclosed for producing chlorine dioxide. The reactor may include a mixing device, a first feed line connected to the mixing device, and a second feed line connected to the mixing device. The reactor may include a proximal portion in fluid communication with the mixing device and a distal portion in fluid communication with a motive water line. The mixing device, the reactor, a portion of the first feed line, and a portion of the second feed line may be positioned within the motive water line.

In some embodiments, the reactor may include a coiled configuration having a coil plane angle of about 1 degrees to about 60 degrees.

In some embodiments, the reactor may include at least one contact zone, wherein the contact zone includes an inner diameter at least two times larger than an inner diameter of the reactor.

In some embodiments, the first feed line and the second feed line are opposite to and directed against each other.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
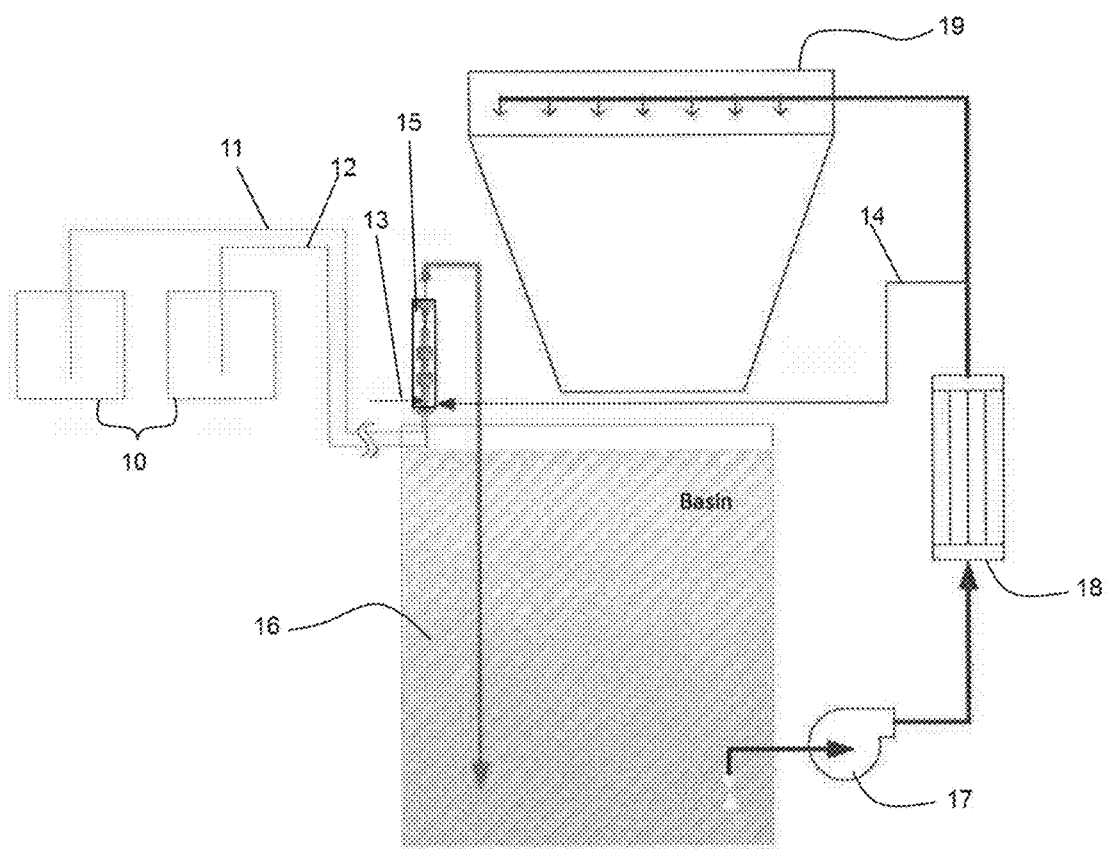
FIG. 1 shows a conceptual diagram of an embodiment of a method of treating cooling tower water by generating chlorine dioxide onsite.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Traditionally, an eductor withdraws the chlorine dioxide solution from the reactor using reduced pressure. Reduced pressure is produced by feeding motive water through the eductor. However, the quality of the motive water must be carefully controlled to avoid producing varying pressures. Varying pressures can lead to inefficiencies in chlorine dioxide production.

In some embodiments of the present disclosure, a method is disclosed for treating process water. The method may include feeding a first solution comprising an acid through a first feed line into a mixing device and feeding a second solution comprising chlorate and hydrogen peroxide through a second feed line into the mixing device. The first and second solutions may then be mixed in the mixing device to form a reaction mixture. A reactor may be connected to the mixing device. After mixing, the reaction mixture may be fed into the reactor. The acid, chlorate, and hydrogen peroxide may react in the reactor thereby producing chlorine dioxide. The reactor may include a proximal portion connected to the mixing device and a distal portion in fluid communication with a motive water line. The mixing device, the reactor, a portion of the first feed line, and a portion of the second feed line may be positioned within the motive water line. As the reaction mixture exits the reactor, the reaction mixture may mix with motive water in the motive water line at the distal portion of the reactor. The mixed chlorine dioxide and motive water may be injected into the process water.

In some embodiments, the first solution may consist of or comprise sulfuric acid and water, where the sulfuric acid concentration ranges from about 50% by weight to about 98% by weight. The sulfuric acid concentration in the first solution may be about 78%. In some embodiments, the second solution may comprise or consist of chlorate, hydrogen peroxide, and water. The second solution may comprise a concentration of chlorate that is in a range of about 25% by weight to about 60% by weight. The concentration of chlorate in the second solution may be about 40% by weight. The concentration of hydrogen peroxide in the second solution may be in the range of about 2% by weight to about 30% by weight. The concentration of hydrogen peroxide in the second solution may be about 8% by weight. In some embodiments, the acid may be sulfuric acid and the chlorate may be sodium chlorate.

In certain embodiments, at least two feed lines carry precursor chemicals to the mixing device. In other embodiments, a third feed line may feed water or other chemicals to the mixing device. In some embodiments, the feed lines to the mixing device may consist of a first feed line and a second feed line.

In other embodiments, the method may further include the step of cooling the mixing device and the reactor with the motive water. The motive water passing through the motive water line may serve to control the temperature of the solutions in the feed lines and the temperature of the reaction mixture.

In some embodiments, the reactor may comprise a coiled configuration, which may further increase mixing and enhance mixing. The reactor having a coiled configuration may include a coil plane angle in a range from about 1 to about 60 degrees. In some embodiments, the coil plane angle may be from about 5 to about 30 degrees. The reactor having a coiled configuration may include a coil diameter. The coil diameter may be in a range from about 0.1 to about 16.0 inches, about 1 inch to about 16 inches, about 2 inch to about 16 inches, about 2 inch to about 10 inches, or about 2 inches to about 4 inches.

In some embodiments, the motive water line may comprise at least two channels. The channels may be longitudinal. In some embodiments, the motive water line may be a double containment pipe. The motive water line may have an inner channel and an outer channel through which motive water may flow, and the reactor may be positioned within the inner channel. The motive water flow rate in the outer channel may be different than the flow rate of the motive water in the inner channel. The motive water flow rate in the inner channel may be such that the temperature of the reaction mixture is controlled within a certain range. The reaction mixture temperature may be about 2° C. to about 80° C., about 2° C. to about 70° C., about 35° C. to about 70° C., about 40° C. to about 70° C., or about 50° C. to about 70° C. The reaction mixture temperature may be about 60° C. The temperature of the motive water in the outer channel may be different from the temperature of the motive water in the inner channel. The outer channel may contain motive water having a flow rate sufficient to dilute the chlorine dioxide to a safe concentration such as less than about 3,000 ppm, less than about 2,000 ppm, less than about 1,500 ppm, less than about 1,000, less than about 750 ppm, less than about 500 ppm, less than about 250 ppm, less than about 100 ppm, or less than about 50 ppm.

In some embodiments, the first feed line and the second feed line may be opposite to and directed against each other. In this configuration, the solutions fed through the first and second feed lines may collide and mix.

In some embodiments, the reactor may include at least one contact zone. In some embodiments, the reactor may include at least two, three, four, or more contact zones. In other embodiments, the contact zone may comprise an inner diameter at least about two times larger than an inner diameter of the reactor. In some embodiments, the contact zone may comprise an inner diameter at least about three, four, or five times larger than an inner diameter of the reactor.

In some embodiments, the acid, the chlorate, and the hydrogen peroxide may form a reaction mixture in the mixing device. At least one advantage of using a solution of chlorate and hydrogen peroxide to react with an acid solution is that no chlorine gas is produced. The absence of chlorine gas provides a more safe and economical process.

In certain embodiments, the reaction mixture may have a residence time in the reactor of at least about 0.1 minute. In some embodiments, the reaction mixture may have a residence time in the reactor of at least about 1 minute. In other embodiments, the reaction mixture may reside in the reactor for at least about 3 minutes, at least about 4 minutes, at least about 5 minutes, at least about 6 minutes, at least about 7 minutes, at least about 8 minutes, at least about 9 minutes, or at least about 10 minutes. In some embodiments, the reaction mixture may have a residence time in the reactor of about 3.8 minutes. Residence time may be calculated by dividing total reactor volume by total precursor flow rate.

In some embodiments, the precursors (the acid, the chlorate, and the hydrogen peroxide) may be fed into the mixing device at a flow velocity of about 25 cm/minute. In some embodiments, the precursors may be fed into the mixing device at a flow velocity in a range from about 20 cm/minute to about 200 cm/minute, about 20 cm/minute to about 65 cm/minute, or about 20 cm/minute to about 50 cm/minute. In some embodiments the precursor velocity may be about 25 cm/minute, about 50 cm/minute, or about 65 cm/min. Precursor velocity can be calculated by dividing total precursor flow rate by the cross-sectional area of the reactor.

In other embodiments, the reactor may be operated at a pressure about equal to or greater than atmospheric pressure.

In some embodiments, the method may include withdrawing chlorine dioxide using an eductor. In some embodiments, the methods disclosed do not use an eductor to withdraw chlorine dioxide from the reactor. In some embodiments, the reactor does not comprise an educator.

In some embodiments, the method may include operating the reactor at a temperature in a range from about 2° C. to about 80° C. In some embodiments, the method may include operating the reactor at a temperature of about 60° C.

In some embodiments, the temperature of the motive water may be in a range from about 2° C. to about 80° C. The motive water temperature may be in range from about 15° C. to about 70° C., about 30° C. to about 70° C., about 40° C. to about 70° C., about 40° C. to about 60° C., or about 50° C. to about 70° C.

In some embodiments, the method may include determining a chlorine dioxide demand in the process water using measurements from a sensor, such as a chlorine dioxide sensor, an oxidation and reduction potential, a flow meter, a microbiological measurement, or any combination thereof. In some embodiments, the chlorine dioxide may be added to the process water in a cooling tower.

In some embodiments, the chlorine dioxide may be added to an aqueous system. The present disclosure is not limited to adding chlorine dioxide to process water in cooling towers.

In some embodiments, the method may include a process control system including a Programmable Logic Controller (PLC), a chlorine dioxide analyzer, a pressure transmitter (PT) and a flow transmitter (FT), controls the feed pumps for the chemicals to the reactor and for the motive water.

In some embodiments, the method may include a distribution system. The distribution system may include at least two independently controlled dosing points. The distribution system may include, for example, 3, 4, 5, 6, 7, or 8 independently controlled dosing points. When the different $ClO_2$ production set points are entered into the controller, the PLC automatically calculates and adjusts the required production of the chlorine dioxide reactor. A distribution system may allow chlorine dioxide solution to be distributed to multiple points directly from the discharge chlorine dioxide reactor, thus avoiding a storage tank system. The distribution system may incorporate a $ClO_2$ solution pump and flowmeters and control valves to manage the distribution among various dosing points.

The flow meters that may be used with the disclosed methods may be any suitable flow meter, such as but not limited to clamp-on or pulse flow meters. Pulse-based flow meters detect the kinetic energy of flowing fluid using optical or magnetic sensors and converting it into electrical energy in the form of digital pulses. The flow rate can be determined by measuring the periods of the pulses.

The pumps used to feed the first and second solutions may be in communication with the PLC. The PLC may also be in communication with any pumps placed on a product feed line.

In some embodiments, the reactor may be in fluid communication with at least one product feed line. Pumps may be placed on each one of the product feed lines, or in some embodiments, multiple product feed lines may share a single pump.

In some embodiments, any of the methods disclosed herein may include determining a flow rate of the first solution in the first feed line, a flow rate of the second solution in the second feed line, a flow rate of a chlorine dioxide solution in a product feed line, or a flow rate of the motive water in the motive water line.

In some embodiments, the flow rate of any solutions being fed into the reactor may be determined using at least two flow meters that determine the flow rate based on different principles to ensure that an accurate amount of precursor chemical is being fed into the reactor.

In some embodiments, any of the methods disclosed herein may include sensing a reactor pressure. In some embodiments, the product feed lines may be equipped with a check valve, flow meter, and feed pump.

In certain embodiments, any of the methods disclosed herein may include calculating a chlorine dioxide dose. The chlorine dioxide dose may be calculated using the flow rates of the, first solution, second solution, motive water, chlorine dioxide solution in the product feed lines, and the chlorine dioxide concentration. For example, the chlorine dioxide concentration in the main line can be calculated using the formula: Main Line Product Rate=$(F_p+F_a+F_w-F_{productline})$*$C_{ClO2}$ where $F_p$ is the flow rate of hydrogen peroxide and chlorate, $F_a$ is the flow rate of the acid, $F_w$ is the flow rate of the motive water, $F_{productline}$ is the sum of flow rates in any product feed lines connected to the main line, and $C_{ClO2}$ is the concentration of chlorine dioxide.

Multiple alarms and failsafe settings may be set using the PLC. For example, pump issues may be detected by monitoring the differential between the flow meter readings and the pump rate calculations. Some failsafes may include pressure relief valves on the reactor or product feed lines. Any of the feed lines may have a pressure sensor that communicates readings to the main control device. By way of example, the main control device may include a PLC and an Adam AI/AO (analog input/analog output) module. If the reactor is housed in a cabinet, then the cabinet may have leak detection sensors and a cabinet door lock.

In other embodiments of the present disclosure, a method is provided for producing chlorine dioxide. The method may include feeding a first solution comprising an acid through a first feed line into a mixing device and feeding a second solution comprising chlorate and hydrogen peroxide through a second feed line into the mixing device. The method may include mixing the first solution and the second solution in the mixing device. The mixing device may be connected to a reactor. After mixing, the first solution and the second solution may be fed into the reactor where the acid, the chlorate, and the hydrogen peroxide react to form chlorine dioxide. The reactor may include a proximal portion connected to the mixing device and a distal portion in fluid communication with a motive water line. The mixing device, the reactor, a portion of the first feed line, and a portion of the second feed line may be positioned within the motive water line. The method may include mixing the chlorine dioxide with motive water in the motive water line at the distal portion of the reactor.

In other embodiments of the present disclosure, a reactor is provided for producing chlorine dioxide. The reactor may include a mixing device, a first feed line connected to the mixing device, and a second feed line connected to the mixing device. The reactor may include a proximal portion in fluid communication with the mixing device and a distal portion in fluid communication with a motive water line. The mixing device, the reactor, a portion of the first feed line, and a portion of the second feed line may be positioned within the motive water line.

In some embodiments, the diameter of the motive water line may be larger than the diameter of the reactor and the first and second feed lines such that the reactor and the feed lines may be positioned in the lumen of the motive water line.

Figure 4:
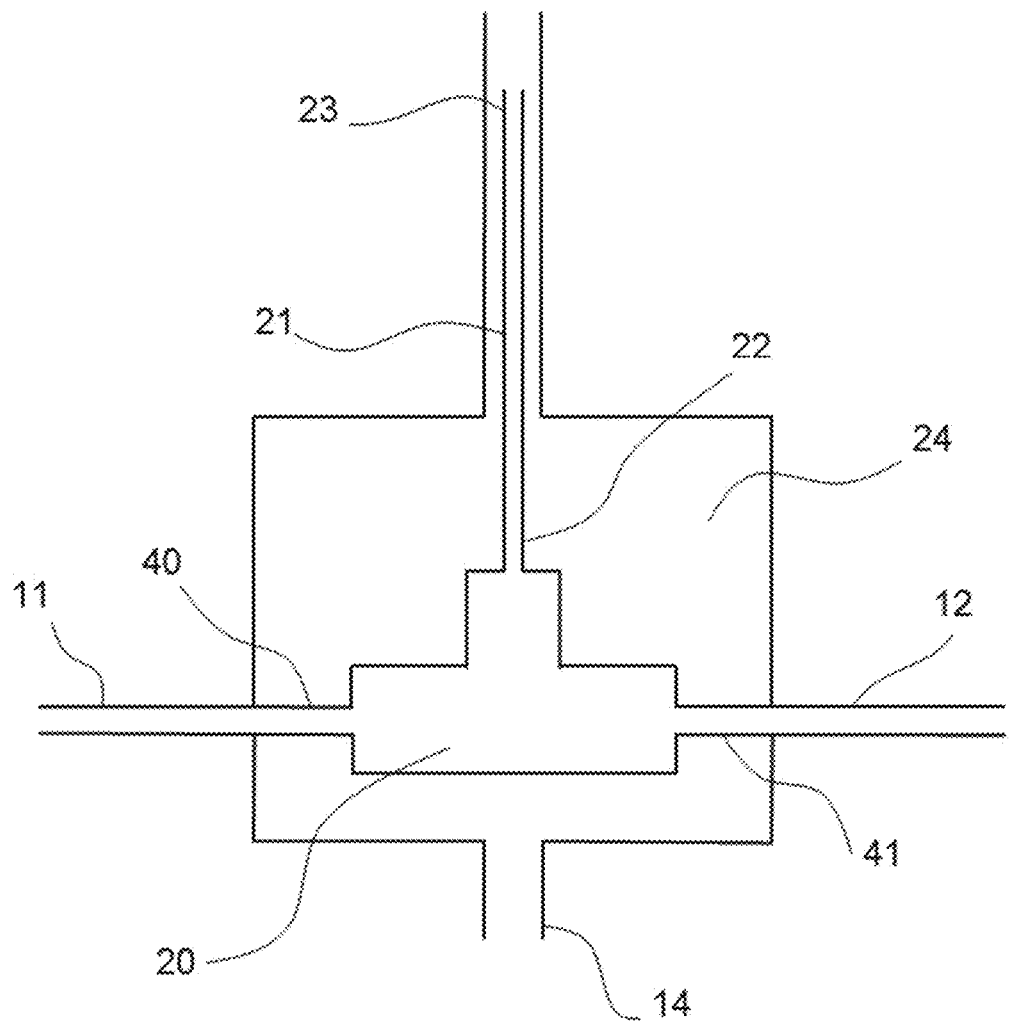
FIG. 4 shows a cross-sectional view of an embodiment of a chlorine dioxide mixer and reactor.

In some embodiments, the first feed line and the second feed line may be opposite to and directed against each other as in a "T" configuration, see, for example, the orientation of components corresponding to reference numerals 11 and 12 in FIG. 4.

In certain embodiments, the reactor may include at least one contact zone. The contact zone may include an inner diameter at least two times larger than an inner diameter of the reactor. As the reaction mixture flows through the reactor it may reach a contact zone where the reaction mixture may further mix. The outlet of the contact zone may narrow to the diameter of the reactor.

In some embodiments, the reactor may have a length in a range from about 25 inches to about 300 inches. In some embodiments, the reactor may have a length in a range from about 30 inches to about 90 inches, about 30 inches to about 80 inches, about 30 inches to about 70 inches, about 30 inches to about 60 inches, about 30 inches to about 50 inches, about 40 inches to about 90 inches, about 40 inches to about 80 inches, about 35 inches to about 45 inches, or about 35 inches to about 60 inches. In other embodiments, the reactor may be about 40 inches in length.

The reactor may be positioned horizontally, vertically, or any angle in between. In some embodiments, the reactor may be positioned vertically. In embodiments where the reactor is a coiled reactor, the reactor may spiral upward.

In some embodiments, the reactor may have an inner diameter in a range from about 0.1 inches to about 4 inches. In some embodiments, the reactor may have an inner diameter in a range from about 1 inch to about 1.25 inches, or about 0.25 inches to about 1.25 inches. In some embodiments, the reactor may have an inner diameter of about 0.25 inches, about 2 inches, about 3 inches, or about 4 inches. In other embodiments, the reactor may have an inner diameter of about 1.25 inches, about 1 inch, about 0.75 inches, about 0.375 inches, or about 0.1875 inches.

In some embodiments, the chlorine dioxide may be produced at a rate in a range from about 0.001 lb/hour to about 20 lb/hour. In some embodiments, the chlorine dioxide may be produced at a rate in a range from about 0.02 lb/hour to about 15 lb/hour. In some embodiments, the chlorine dioxide may be produced at a rate in a range from about 5 lb/hour to about 15 lb/hour. As chlorine dioxide is produced at a higher rate, a larger diameter reactor may be used to ensure that the residence time in the reactor is at least about 3 minutes.

Referring to the figures, FIG. 1 shows a conceptual diagram of certain embodiments for a method of treating cooling tower water onsite. Precursor chemicals may be stored in a tank 10 onsite from which the chemicals may be fed through the first feed line 11 and the second feed line 12 into a chlorine dioxide mixer and reactor 15. Water may be fed into the mixer via line 13 to dilute the precursor chemicals being fed into the chlorine dioxide mixer and reactor 15. Water may be fed into the mixer and reactor 15 through a motive feed line 14. A water line 13 may supply water to the motive water line 14 and/or it may supply water to dilute acid before or after entering the mixer. Chlorine dioxide may be injected into process water 16 that may be fed into a cooling tower 19. A pump 17 may feed the process water 16 through a heat exchanger 18.

Figure 2:
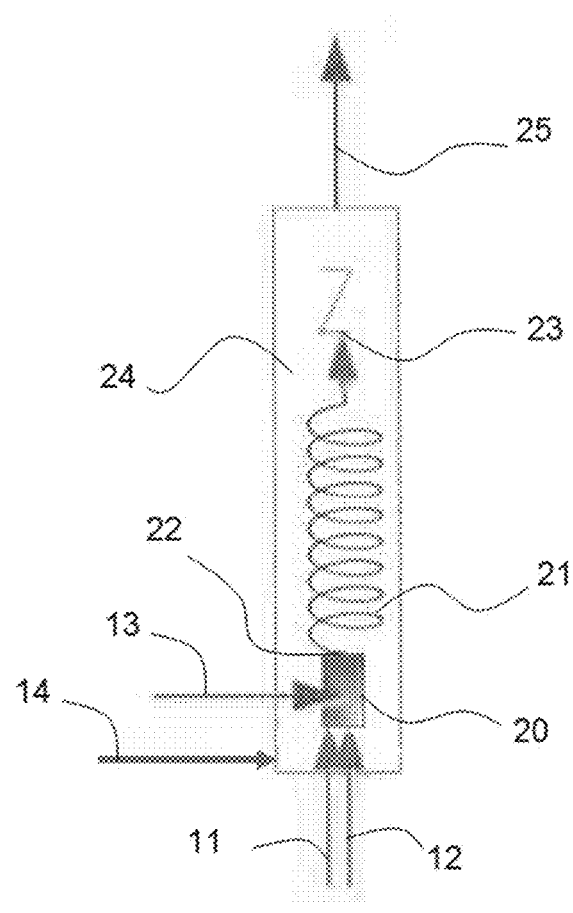
FIG. 2 shows an embodiment of a chlorine dioxide mixer and reactor.
Figure 3:
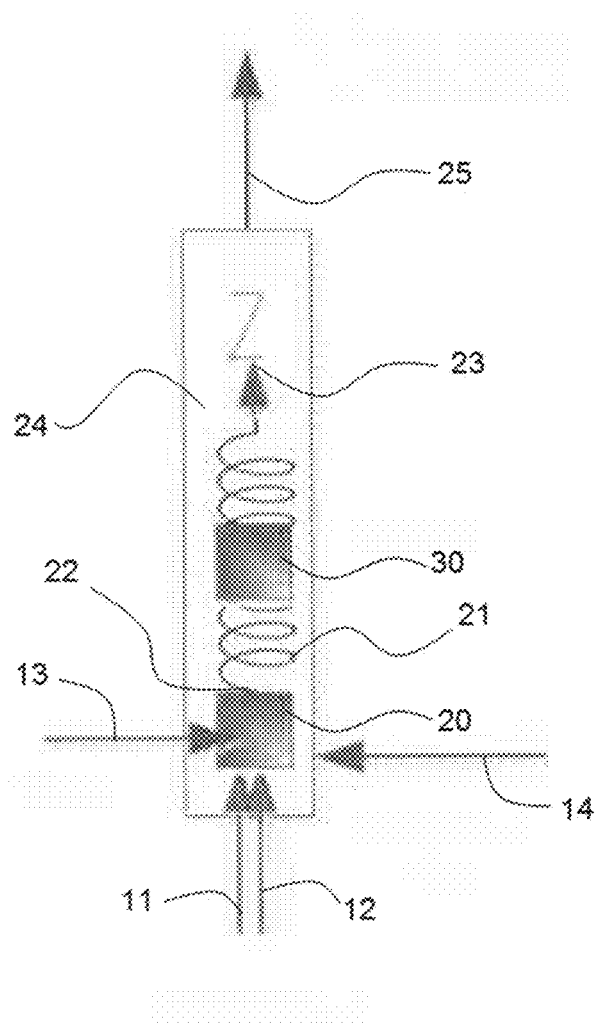
FIG. 3 shows an embodiment of a chlorine dioxide mixer and reactor.

FIG. 2 and FIG. 3 show a closer view of some embodiments of the chlorine dioxide mixer and reactor 15. The first feed line 11 and the second feed line 12 may introduce precursor chemicals into the mixing device 20. In some embodiments, a water line 13 may feed water into the mixing device 20. A motive feed line 14 may supply water to the motive water line 24. In some embodiments, the water in the motive water line 24 may cool the reactor 21. In other embodiments, the water in the motive water line 24 dilutes and mixes with the chlorine dioxide at the distal portion of the reactor 23. The proximal portion of the reactor 22 may be connected to the mixing device 20. Fluid in the mixing device 20 may flow out of the mixing device 20 and into the reactor 21. In some embodiments, the reactor 21 may be in a coiled configuration. In some embodiments, a chlorine dioxide feed line 25 carries the chlorine dioxide mixed with motive water to the process water. Some embodiments may include at least one contact zone 30 (see FIG. 3, for example). The contact zone 30 may allow for increased mixing of the reaction mixture or increased residence time in the reactor in order to increase reaction efficiency.

FIG. 4 shows an embodiment where the first feed line 11 and the second feed line 12 are opposite to and directed against each other. The solutions mix in the mixing device 20 and then enter the proximal portion of the reactor 22. The reaction mixture may continue to flow through the reactor 21 and exit the distal portion of the reactor 23 and mix with the motive water in the motive water line 24. Water may be fed into the motive water line 24 from the motive feed line 14. In some embodiments, the mixing device 20, the reactor 21, a portion of the first feed line 40, and a portion of the second feed line 41 are positioned within the motive water line 24.

Figure 5:
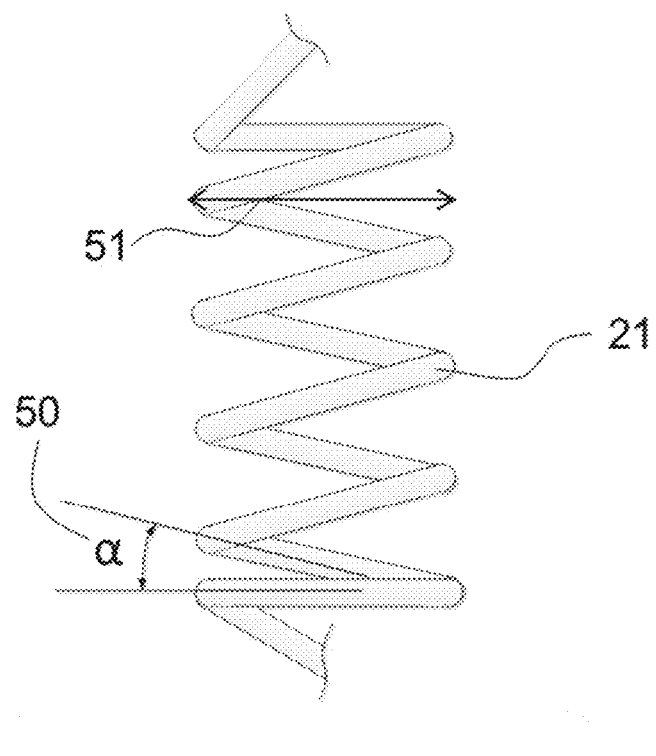
FIG. 5 shows an embodiment of a coiled reactor.

FIG. 5 shows an embodiment where the reactor 21 may comprise a coiled configuration. The reactor having a coiled configuration may include a coil plane angle 50 ranging from about 5 to about 30 degrees. The reactor having a coiled configuration may include a coil diameter 51. The coil diameter may range from about 0.1 inch to about 4.0 inches. The inner diameter of the coil reactor may be as described above for the reactor.

Figure 6:
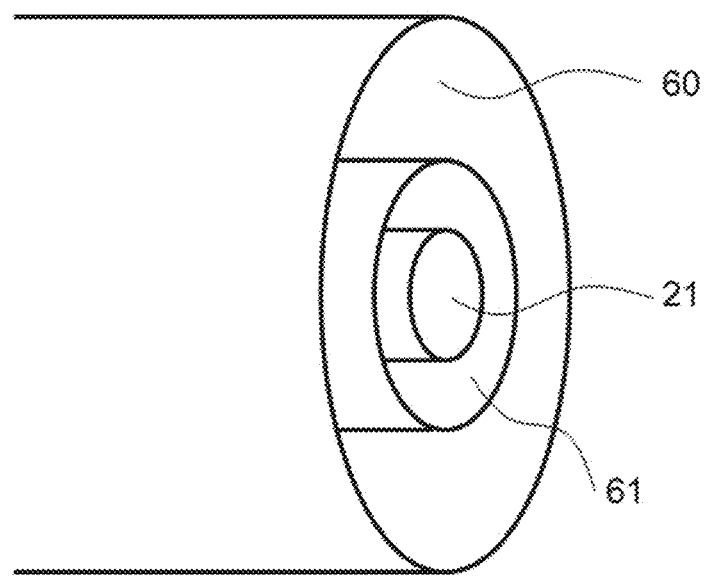
FIG. 6 shows a cross-sectional view of an embodiment of the motive water line and the reactor.

FIG. 6 show an embodiment where the motive water line comprises an outer channel 60 and an inner channel 61. The reactor 21 may be disposed within the lumen of the inner channel 61. In this configuration the motive water may be fed into the motive water line via two separate channels. The outer channel 60 and inner channel 61 may carry motive water at difference flow rates. The motive water in the outer channel 60 may have a different temperature than the motive water in the inner channel 61.

Figure 7:
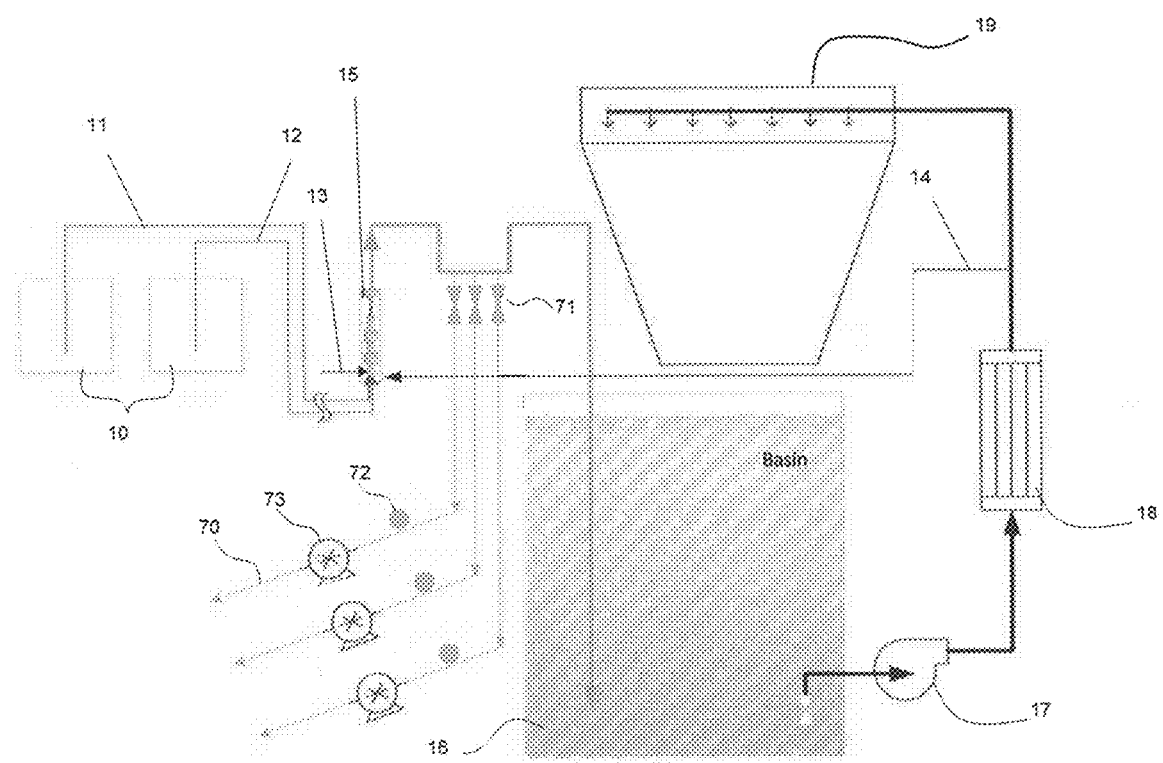
FIG. 7 shows a conceptual diagram of an embodiment of a method of treating cooling tower water and other targets by generating chlorine dioxide onsite.

FIG. 7 shows a conceptual diagram of certain embodiments for a method of treating cooling tower water and multiple targets. Precursor chemicals may be stored in a tank 10 onsite from which the chemicals may be fed through the first feed line 11 and the second feed line 12 into a chlorine dioxide mixer and reactor 15. Water may be fed into the mixer via line 13 to dilute the precursor chemicals being fed into the chlorine dioxide mixer and reactor 15. Water may be fed into the mixer and reactor 15 through a motive feed line 14. Chlorine dioxide may be injected into process water 16 that may be fed into a cooling tower 19. A pump 17 may feed the process water 16 through a heat exchanger 18. The chlorine dioxide generated in the reactor 15 can be added to process water 16 or diverted into a product feed line 70 for treating other targets. The product feed line 70 may include a valve 71, a flow meter 72, and a pump 73. All valves and pumps may be controlled using a PLC (not pictured).

EXAMPLES

Example 1

A solution containing about 40% sodium chlorate and about 8% hydrogen peroxide and an aqueous solution of about 78% sulfuric acid were each fed at a rate of about 63 mL/h through 0.25 inch tubing into a 0.25 inch Kynar Union Tee that was inserted inside a polyvinyl chloride cross tube with about a 2 inch inner diameter.

The precursors from the Kynar Union Tee then flowed through about 40 inches of 0.25 inch tubing (8 mL volume) that was inserted inside 0.5 inch tubing. Motive water flowed into the polyvinyl chloride cross tube and out of the 0.5 inch tubing (around the 0.25 inch tubing) to provide cooling and dilution. The reaction tube length and precursor velocity of about 26.5 cm/min provided a residence time of about 3.81 minutes.

Each experiment ran for about 15 minutes, and the chlorine dioxide concentration was measured about every 5 minutes. The motive water served two purposes: dilution and cooling. Water to precursor ratio of about 30 or less was required to establish the heat needed for the reaction. This generated chlorine dioxide concentrations of greater than about 5,500 mg/L.

Flow velocity of the precursors was set at about 26.5 cm/min. Flow velocities may be greater than about 25 cm/min to allow the gaseous oxygen to remain as nano- and micro-bubbles and to accelerate the movement of nano- and micro-bubbles out of the reactor tube.

The concentration of chlorine dioxide was determined using a spectrophotometer. Readings from the spectrophotometer were used to calculate the chlorine dioxide concentration using a calibration curve. The curve was prepared according to Iodometric Method 4500-$ClO_2$ in Standard Methods for the Examinations of Water and Wastewater 20th edition 1998. The amount of solution consisting of about 40% sodium chlorate and about 7.99% hydrogen peroxide required for 100% reaction efficiency was about 2.86 mL to produce about 1 gram of chlorine dioxide. The reaction or conversion efficiency was calculated from the percentage ratio of the total chlorine dioxide generated to the theoretical chlorine dioxide production based on the amount of Purate consumed: $\eta_{current} = (C_{ClO2} \cdot Q_{ClO2})/(Q_{Purate}/2.86)$ where $C_{ClO2}$ is concentration of chlorine dioxide (g/L), $Q_{ClO2}$ flowrate of chlorine dioxide (L/hour), and $Q_{Purate}$ flow rate of Purate (chlorate about 40% and hydrogen peroxide about 7.99% mixture) (mL/hour).

TABLE 1

Reaction efficiency

| Motive Water (L/h) | 7.50 | 7.50 | 7.50 | 3.76 | 3.76 | 3.76 | 3.14 | 3.14 | 3.14 |
|---|---|---|---|---|---|---|---|---|---|
| Purate Flow Rate (mL/h) | 63.0 | 63.0 | 63.0 | 63.0 | 63.0 | 63.0 | 63.0 | 63.0 | 63.0 |
| 78% Sulfuric Acid Flow Rate (mL/h) | 63.0 | 63.0 | 63.0 | 63.0 | 63.0 | 63.0 | 63.0 | 63.0 | 63.0 |
| Residence Time (min) | 3.81 | 3.81 | 3.81 | 3.81 | 3.81 | 3.81 | 3.81 | 3.81 | 3.81 |
| Water:Prec. Ratio | 60 | 60 | 60 | 30 | 30 | 30 | 25 | 25 | 25 |
| Precursor Flow Velocity (cm/m) | 26.5 | 26.5 | 26.5 | 26.5 | 26.5 | 26.5 | 26.5 | 26.5 | 26.5 |
| Chlorine Dioxide Conc. (g/L) | 2.49 | 2.36 | 2.35 | 5.51 | 5.53 | 6.62 | 6.69 | 6.73 | 6.70 |
| Chlorine Dioxide Flow Rate (L/h) | 7.63 | 7.63 | 7.63 | 3.89 | 3.89 | 3.89 | 3.27 | 3.27 | 3.27 |
| Actual Output (g/h) | 18.7 | 17.7 | 17.6 | 21.4 | 21.5 | 21.8 | 21.8 | 22.0 | 21.9 |
| Theoretical Output (g/h) | 22.0 | 22.0 | 22.0 | 22.0 | 22.0 | 22.0 | 22.0 | 22.0 | 22.0 |
| Reaction Efficiency (%) | 84.9 | 80.3 | 79.9 | 97.2 | 97.6 | 99.1 | 99.1 | 99.8 | 99.3 |

Example 2

In this experiment, a ⅜" inch Tee connected to about 91.4 cm of ⅜" inch tubing was used as a mixing device and reactor, respectively. Different residence times (calculated by dividing reactor volume by total reactant flow rate) and motive water temperatures were tested. The conversion rate was calculated as described above. Purate was a mixture of chlorate and hydrogen peroxide as described above.

TABLE 2

Residence time and temperature effects on conversion.

| Residence Time min | Motive Water Temp ° C. | Purate mole/min | $H_2SO_4$ mole/min | $ClO_2$ lb/hr | $H_2SO_4$/Purate mole/mole | Conversion Rate % |
|---|---|---|---|---|---|---|
| 15.6 | 34 | 0.0095 | 0.0250 | 0.085 | 2.64 | 88.4 |
| 15.6 | 37 | 0.0095 | 0.0250 | 0.085 | 2.64 | 93.4 |
| 8.6 | 36 | 0.0172 | 0.0455 | 0.154 | 2.64 | 87.1 |
| 8.6 | 43 | 0.0172 | 0.0455 | 0.154 | 2.64 | 88.1 |
| 8.6 | 53 | 0.0172 | 0.0455 | 0.154 | 2.64 | 99.7 |
| 8.6 | 51 | 0.0172 | 0.0366 | 0.154 | 2.13 | 86.2 |
| 15.6 | 50 | 0.0095 | 0.0250 | 0.085 | 2.64 | 95.9 |
| 7.8 | 51 | 0.0189 | 0.0500 | 0.169 | 2.64 | 99.9 |
| 3.9 | 50 | 0.0379 | 0.1001 | 0.338 | 2.64 | 89.0 |
| 5.2 | 48 | 0.0284 | 0.0751 | 0.254 | 2.64 | 96.0 |

Example 3

A ¼" inch Tee connected to a 12 ml chamber by about 5.72 cm of ¼" inch tubing was used in this experiment. The chamber was also connected to about 26 cm of ¼" tubing. The configuration was similar to the reactor depicted in FIG. 3 where the 12 ml chamber may be a contact zone.

Table 3 shows the effects of motive water and the ratio of $H_2SO_4$/Purate on conversion rate. Table 4 shows the effects of reduced amount of acid at a motive water temperature of about 62° C. and a residence time of about 14 min. The residence time for these trials was fixed at about 14 min.

TABLE 3

Effects of motive water temperature and $H_2SO_4$/Purate on conversion

| Temp ° C. | Purate mole/min | $H_2SO_4$ mole/min | $ClO_2$ lb/hr | $H_2SO_4$/Purate mole/mole | Conversion Rate % |
|---|---|---|---|---|---|
| 16 | 0.0095 | 0.0250 | 0.085 | 2.64 | 64.8 |
| 30 | 0.0095 | 0.0250 | 0.085 | 2.64 | 92.6 |
| 41 | 0.0095 | 0.0250 | 0.085 | 2.64 | 95.1 |
| 53 | 0.0095 | 0.0250 | 0.085 | 2.64 | 94.4 |
| 62 | 0.0095 | 0.0250 | 0.085 | 2.64 | 97.7 |

TABLE 3-continued

Effects of motive water temperature and $H_2SO_4$/Purate on conversion

| Temp ° C. | Purate mole/min | $H_2SO_4$ mole/min | $ClO_2$ lb/hr | $H_2SO_4$/Purate mole/mole | Conversion Rate % |
|---|---|---|---|---|---|
| 41 | 0.0095 | 0.0205 | 0.085 | 2.16 | 87.8 |
| 47 | 0.0095 | 0.0208 | 0.085 | 2.20 | 95.4 |
| 62 | 0.0095 | 0.0208 | 0.085 | 2.20 | 97.4 |

TABLE 4

Effect of reduced acid at 62° C.

| Temp ° C. | Purate mole/min | $H_2SO_4$ mole/min | $ClO_2$ lb/hr | $H_2SO_4$/Purate mole/mole | Conversion Rate % |
|---|---|---|---|---|---|
| 62 | 0.0095 | 0.0254 | 0.085 | 2.68 | 97.1 |
|  | 0.0095 | 0.0208 | 0.085 | 2.20 | 99.8 |
|  | 0.0095 | 0.0162 | 0.085 | 1.71 | 92.7 |
|  | 0.0095 | 0.0127 | 0.085 | 1.34 | 65.9 |

Table 5 shows the effects of residence time and motive water temperature on conversion rate.

TABLE 5

Effect of residence time and temperature on conversion rate.

| Residence Time min | Temp ° C. | Purate mole/min | $H_2SO_4$ mole/min | $ClO_2$ lb/hr | $H_2SO_4$/Purate mole/mole | Conversion Rate % |
|---|---|---|---|---|---|---|
| 3 | 53 | 0.0095 | 0.0159 | 0.085 | 1.68 | 52.7 |
| 14 | 47 | 0.0095 | 0.0162 | 0.085 | 1.71 | 78.9 |
| 14 | 62 | 0.0095 | 0.0162 | 0.085 | 1.71 | 92.7 |
| 17 | 45 | 0.0095 | 0.0159 | 0.085 | 1.68 | 71.7 |
| 17 | 46 | 0.0095 | 0.0162 | 0.085 | 1.71 | 83.7 |
| 17 | 46 | 0.0189 | 0.0324 | 0.170 | 1.71 | 68.5 |
| 17 | 62 | 0.0095 | 0.0162 | 0.085 | 1.71 | 92.1 |

Example 4

In this experiment, a ¼" inch Tee connected to a 12 ml chamber by about 2 feet of ¼" inch tubing was used. The chamber was also connected to about 10 feet of ¼" tubing. The configuration was similar to the reactor depicted in FIG. 3 where the 12 ml chamber may be a contact zone. The volume of the reactor was about 78.2 ml.

TABLE 6

Effect of residence time, motive water temperature, and acid on conversion rate.

| Residence Time min | Temp ° C. | Purate mole/min | $H_2SO_4$ mole/min | $ClO_2$ lb/hr | $H_2SO_4$/ Purate mole/mole | Conversion Rate % |
|---|---|---|---|---|---|---|
| 21.1 | 31.2 | 0.0095 | 0.0250 | 0.085 | 2.64 | 95.0 |
| 21.1 | 29.3 | 0.0095 | 0.0205 | 0.085 | 2.16 | 90.0 |
| 21.1 | 35.6 | 0.0095 | 0.0205 | 0.085 | 2.16 | 88.5 |
| 21.1 | 37.5 | 0.0095 | 0.0205 | 0.085 | 2.16 | 93.0 |
| 21.1 | 44.1 | 0.0095 | 0.0205 | 0.085 | 2.16 | 99.1 |
| 10.6 | 43.9 | 0.0189 | 0.0409 | 0.169 | 2.16 | 87.6 |
| 10.6 | 43.5 | 0.0189 | 0.0455 | 0.169 | 2.40 | 89.3 |
| 11.6 | 43.3 | 0.0172 | 0.0455 | 0.154 | 2.64 | 97.1 |
| 11.6 | 33.8 | 0.0172 | 0.0455 | 0.154 | 2.64 | 85.7 |

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the apparatuses and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of treating process water, comprising:
    feeding a first solution comprising an acid through a first feed line into a mixing device;
    feeding a second solution comprising chlorate and hydrogen peroxide through a second feed line into the mixing device;
    mixing the first solution and the second solution in the mixing device to form a reaction mixture, wherein the mixing device is connected to a reactor;
    feeding the reaction mixture into the reactor;
    reacting the acid, the chlorate, and the hydrogen peroxide to produce chlorine dioxide in the reactor, wherein the reactor comprises a proximal portion connected to the mixing device and a distal portion in fluid communication with a motive water line, wherein the mixing device, the reactor, a portion of the first feed line, and a portion of the second feed line are positioned within the motive water line, wherein the reactor comprises a coiled configuration having a coil plane angle of about 1 degrees to about 60 degrees;
    mixing the chlorine dioxide with motive water in the motive water line at the distal portion of the reactor; and
    injecting the chlorine dioxide and the motive water into the process water.

2. The method of claim 1, further comprising cooling the mixing device and the reactor with the motive water.

3. The method of claim 1, wherein the acid is sulfuric acid.

4. The method of claim 1, wherein the first feed line and the second feed line are opposite to and directed against each other.

5. The method of claim 1, wherein the motive water line comprises at least two longitudinal channels through which motive water may flow.

6. The method of claim 5, wherein the reaction mixture has a residence time in the reactor of at least about 0.1 minute, and a precursor velocity is at least about 25 cm/min, wherein the precursor velocity is a velocity of the first and second solutions.

7. The method of claim 6, wherein the reactor is operated at a pressure about equal to or greater than atmospheric pressure.

8. The method of claim 1, further comprising producing the chlorine dioxide at a rate ranging from about 0.001 lb/hour to about 20 lb/hour.

9. The method of claim 1, further comprising operating the reactor at a temperature ranging from about 2° C. to about 80° C.

10. The method of claim 1, further comprising determining a chlorine dioxide demand in the process water using measurements selected from a chlorine dioxide sensor, an oxidation and reduction potential, a flow meter, a microbiological measurement, and any combination thereof.

11. The method of claim 1, wherein a cooling tower comprises the process water.

12. A method, comprising:
    feeding a first solution comprising an acid through a first feed line into a mixing device;

feeding a second solution comprising chlorate and hydrogen peroxide through a second feed line into the mixing device;

mixing the first solution and the second solution in the mixing device to form a reaction mixture, wherein the mixing device is connected to a reactor;

feeding the reaction mixture into the reactor;

reacting the acid, the chlorate, and the hydrogen peroxide to produce chlorine dioxide in the reactor, wherein the reactor comprises a proximal portion connected to the mixing device and a distal portion in fluid communication with a motive water line, wherein the mixing device, the reactor, a portion of the first feed line, and a portion of the second feed line are positioned within the motive water line, wherein the reactor comprises a coiled configuration having a coil plane angle of about 1 degrees to about 60 degrees;

mixing the chlorine dioxide with motive water in the motive water line at the distal portion of the reactor; and injecting the chlorine dioxide into an aqueous system.

13. The method of claim 12, wherein the reactor is in fluid communication with a product feed line.

14. The method of claim 12, further comprising determining a flow rate of the first solution in the first feed line.

15. The method of claim 12, further comprising determining a flow rate of the second solution in the second feed line.

16. The method of claim 12, further comprising determining a flow rate of a chlorine dioxide solution in a product feed line.

17. The method of claim 12, further comprising determining a flow rate of the motive water in the motive water line.

18. The method of claim 12, further comprising sensing a reactor pressure.

19. A method of producing chlorine dioxide, comprising:
feeding a first solution comprising an acid through a first feed line into a mixing device;

feeding a second solution comprising chlorate and hydrogen peroxide through a second feed line into the mixing device;

mixing the first solution and the second solution in the mixing device to form a reaction mixture, wherein the mixing device is in fluid communication with a reactor;

feeding the reaction mixture into the reactor;

reacting the acid, the chlorate, and the hydrogen peroxide in the reactor, wherein the reactor comprises a proximal portion in fluid communication with the mixing device and a distal portion in fluid communication with a motive water line, wherein the mixing device, the reactor, a portion of the first feed line, and a portion of the second feed line are positioned within the motive water line, wherein the reactor comprises a coiled configuration having a coil plane angle of about 1 degree to about 60 degrees; and mixing chlorine dioxide with motive water in the motive water line at the distal portion of the reactor.

20. The method of claim 19, wherein the acid is sulfuric acid.

21. The method of claim 19, wherein the reactor is operated at a pressure about equal to or greater than atmospheric pressure.

22. The method of claim 19, further comprising producing the chlorine dioxide at a rate ranging from about 0.001 lb/hour to about 20 lb/hour.

23. The method of claim 19, further comprising operating the reactor at a temperature ranging from about 2° C. to about 80° C.

* * * * *